Dec. 9, 1952     H. C. LORD     2,620,845
CUSHIONED TIRE Filed May 9, 1949     7 Sheets-Sheet 1

Inventor
Hugh C Lord
Ralph Hammar Attorney

Dec. 9, 1952   H. C. LORD   2,620,845
CUSHIONED TIRE

Filed May 9, 1949   7 Sheets-Sheet 2

Hugh C Lord
INVENTOR

BY Ralph Hamma
ATTORNEY

Dec. 9, 1952  H. C. LORD  2,620,845
CUSHIONED TIRE
Filed May 9, 1949  7 Sheets—Sheet 3

FIG. 7.

Inventor
Hugh C Lord
Ralph Hamma
Attorney

Dec. 9, 1952 — H. C. LORD — 2,620,845
CUSHIONED TIRE
Filed May 9, 1949 — 7 Sheets-Sheet 4

Inventor
Hugh C Lord
Ralph Hammar
Attorney

Dec. 9, 1952 H. C. LORD 2,620,845
CUSHIONED TIRE

Filed May 9, 1949 7 Sheets-Sheet 5

Inventor
Hugh C. Lord
By Ralph Hamma
Attorney

Dec. 9, 1952  H. C. LORD  2,620,845
CUSHIONED TIRE
Filed May 9, 1949  7 Sheets-Sheet 6

Inventor
Hugh C Lord
By Ralph Hammar
Attorney

Patented Dec. 9, 1952

2,620,845

UNITED STATES PATENT OFFICE 2,620,845

CUSHIONED TIRE

Hugh C. Lord, Erie, Pa., assignor to Lord Manufacturing Company, Erie, Pa., a corporation of Pennsylvania Application May 9, 1949, Serial No. 92,152

10 Claims. (Cl. 152—328)

This invention is a cushion tire in which the tread is connected to the rim through a cushion free to yield preferably locally. One feature of the cushion is that it has inclined walls carrying the load in shear. In a preferred form the cushion walls are a circumferential lattice section, that is, a section formed of circumferentially extending walls intersecting to form a lattice in radial transverse section. Such a form of lattice makes possible various forms of lattice dimensions differing in relative resistance in various directions, namely, as circumferentially under traction, radially under load and laterally under side strain. In a preferred form the circumferential lattice walls are spiralled to provide a helical lattice. The helical lattice section makes possible utilizing the rotative movement of the lattice walls relative to the air to produce a heat absorbing, wiping action of air against the wall surfaces. The wiping action is aided by the retarding effect of the inertia of the air which increases the relative wiping action between the air and the lattice wall surfaces. The helical lattice is also, in some instances, easier to mold since the complete tire may be unthreaded from helical cores. The tread may have spiral road engaging ribs which have a squeegee action for driving traction and braking. Further objects and advantages appear in the specification and claims.

In the accompanying drawings.

Figure 1:
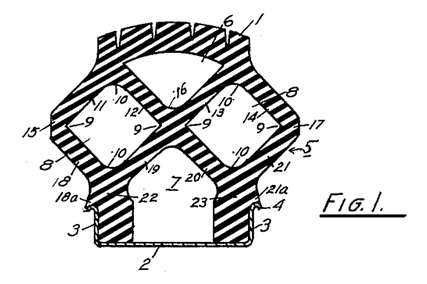
Fig. 1 is a radial transverse section on line 1—1, Fig. 2, through a tire having a circumferential lattice between the tread and rim and formed with axially separated side portions.

Referring to the drawings, 1 indicates the tread, 2 indicates a demountable rim having side flanges 3 with rolled edges 4, and 5 indicates a circumferential lattice section bonded to the rim and connecting the tread section and rim. The lattice section wall is formed with triangular circumferential cores 6 and 7 respectively, adjacent the tread and rim, and intermediate diamond circumferential passages 8. The triangular and diamond sections have sharp corners 9 at the sides where the load tends to squeeze the corners together and rounded corners 10 at the top and bottom where the load tends to spread the corners apart. The load is transmitted from the tread through inclined walls 11, 12, 13 and 14 to junctions 15, 16, and 17 and from these junctions through inclined walls 18, 19, 20 and 21 to junctions 22 and 23 adjacent the side flanges 3 of the rim. The junctions 15 and 17 project laterally beyond the tread to provide side cushions. The lower ends of the walls 18 and 21 are thickened at 18a, 21a to seat on the outwardly curled edges 4. This prevents localized strain at the bond to the rim.

The radial load transmitted through the inclined lattice walls 11—14 and 18—21 is subjected to shear stresses. For the angle shown the greater part of the load is transmitted in shear and is effective in cushioning the load. Rubber in shear gives a more satisfactory cushioning performance than rubber in compression. The distribution of the load between compression and shear may be varied by the inclination and span of the lattice walls. Circumferential load due to the driving torque and the braking forces is transmitted circumferentially along the lattice walls thus bringing the extended walls circumferentially under shear stress. The resistance to these forces is substantially unaffected by the inclination of the lattice walls. Because these forces are circumferential the forces are resisted by a greater length of the lattice walls than is called into action to withstand the local radial loads ordinarily resulting from contact of the tread with the road. The greater resistance to circumferential load such as that due to driving traction and braking forces is a desirable characteristic.

Figure 2:
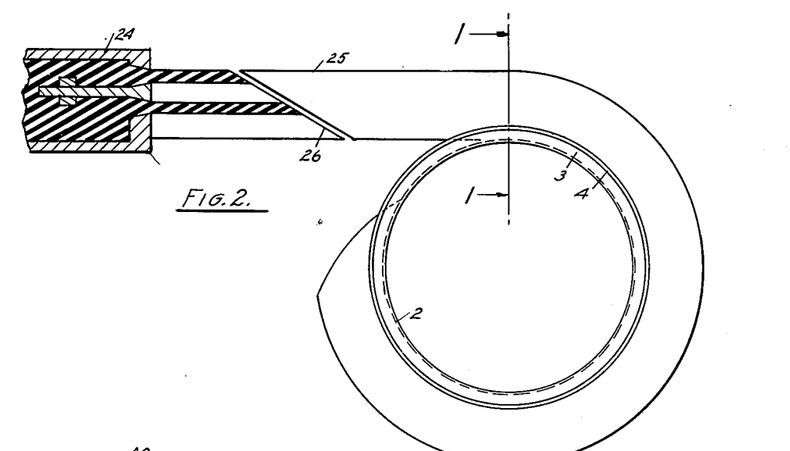
Fig. 2 is a diagrammatic view showing the manufacture of the tire by wrapping an extruded section around the rim.

In Fig. 2 is shown an extruding head 24 which extrudes a section 25 having the radial cross section of the tire shown in Fig. 1. This extruded section is cut along a bias as indicated at 26, wrapped around the rim 2 and then cured in a mold.

Figure 3:
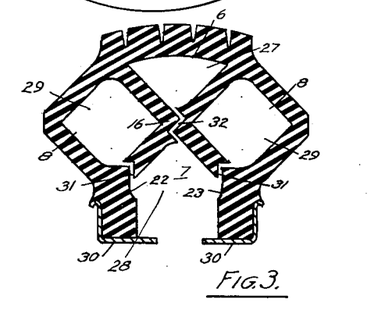
Figs. 3 and 4 illustrate a tire of circumferential lattice formation adapted to manufacture in a mold having segmental cores.

Fig. 3 illustrates the manufacture of the tire that may be formed with segmental inwardly retractable cores. The triangular sections 6 and 7 are formed by cores 27 and 28 and the diamond sections 8 are formed by cores 29. The rim is made in split sections 30 which after moulding are spread apart to permit withdrawal of the cores. After withdrawing the cores 28, the cores 29 are withdrawn through core openings 31 in the junctions 22 and 23. After removal of the cores 29 the cores 27 may be removed through the core opening 32 in the junction 16. The specific construction of the cores 27, 28, 29, and of the core extensions in the openings 31 and 32 are not illustrated. In the use of the tire the split rim sections 30 are squeezed together sufficient to close the core openings 31 and 32. Thereafter the tire functions as though molded without the separations. If desired, the mating surfaces of the core openings 31 and 32 may be coated with cement so as to insure against slippage. The angular or stepped shape of the core openings 31 and 32 tends to prevent slippage. The apex of each angular opening 31 points along the mating inclined wall. The forces at the joint formed by openings 32 are substantially wholly horizontal and in the direction to close the opening.

Figure 4:
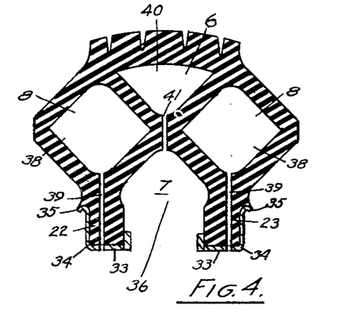

In Fig. 4 is shown another arrangement for making the tire of Fig. 1 through the use of segmental retractable cores. In this arrangement the rim is split into four sections, angular inner sections 33 on the inner corner of junctions 22 and 23, and angular outer sections on the outer sections 34 of the outer corners of the junctions. The rim sections 34 have outwardly curved edges 35 corresponding to the edges 4 on the rim 2. The triangular section 7 is formed by a segmental core 36. The diamond sections 8 are formed by segmental cores 38 which are removed through radial core openings 39 through the center of junctions 22 and 23. The outer triangular section 6 is formed by a segmental core 40 removed through radial core openings 41 through the center of the junctions 16. As in the Fig. 3 construction, the segmental core forming the triangular section 7 is removed first. It is then possible to spread the rim sections 33 and 34 sufficient to remove the cores 38, and thereafter the core 40. In the use of the tire the rim sections 33 and 34 are squeezed together sufficient to close the core openings 39 and 41. There is substantially no tendency for slippage at the opening 41 since the forces transmitted from the tread are horizontal and in the direction to close the opening. The same is true of the openings 39. Slippage at these openings is further prevented by the bonding of the junctions 22 and 23 to the rim sections 33 and 34.

Figure 5:
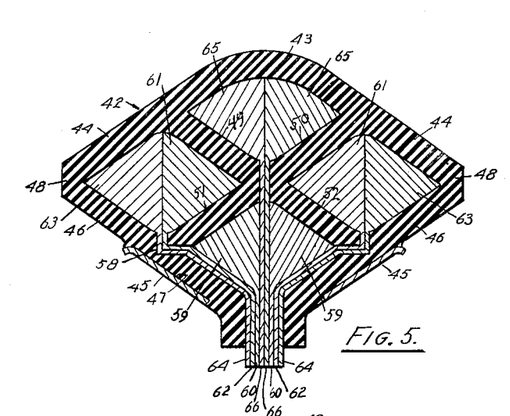
Fig. 5 is a radial cross section through a modification with the segmental cores in place.
Figure 6:
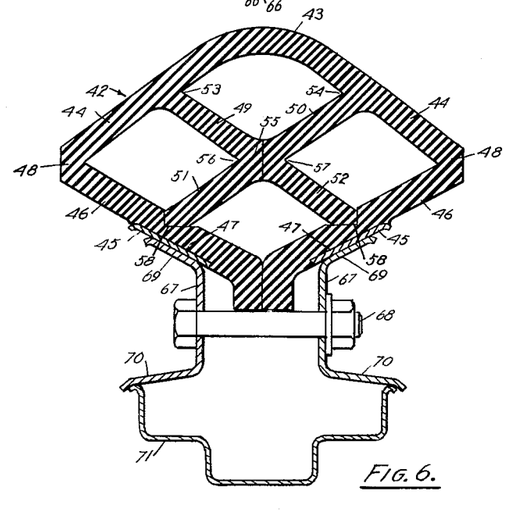
Fig. 6 is a section through the Fig. 5 tire mounted on a wheel rim.
Figure 7:
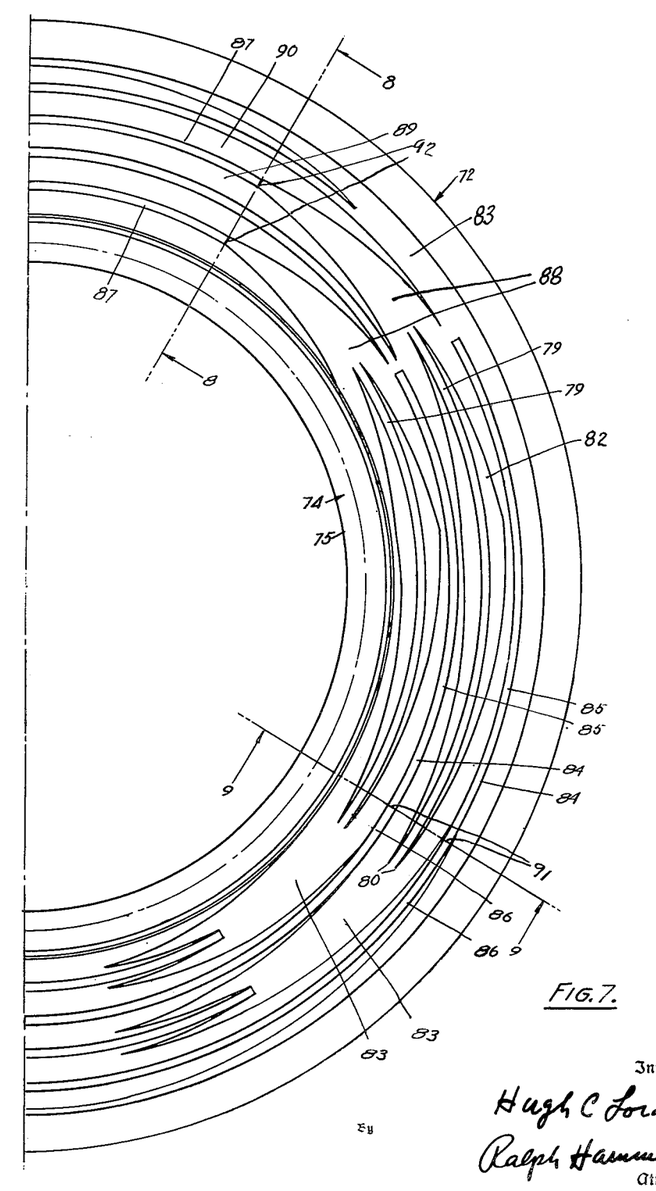
Fig. 7 is a side view of a helical lattice tire.

In the modification shown in Figs. 5 and 6 there is an arched outer span 42 having a convex center section 43 which progressively flattens under a load to increase the width of tread contact. The sides of the convex center section 43 merge into inclined shear sections 44 which are inclined at such an angle that radial load is transmitted predominately in shear. There is no sharp line of demarcation between the end of the tread section 43 and the beginning of the shear section 44. Under load the width of tread contact continually increases and thereby shortening the length of the shear sections. This produces a desirable stiffening of the tire under shock loads. The load from the shear section 44 is transmitted to split rims 45 through inclined shear sections 46 which are bonded to the inclined surfaces 47 of the rim sections and extend laterally outward from the rim section in substantially direct continuation of the surfaces 47. The inclination of the section 46 is such that radial loads are substantially wholly accommodated in shear. The sections 46 and 44 meet at junctions 48, having sharp corners on the inside which tends to reduce localized stress at junction, as the sections 44 and 46 are brought together under radial loads. The junctions 48 project beyond the rims 45 and serve as side cushions for the tire. Because of the angle of the shear sections 44 and 46, side thrusts on the junctions 48 are transmitted substantially wholly in direct stress (compression or tension).

The load carrying capacity of the construction so far described may be further increased through the use of supplemental load carrying sections 49, 50, 51, and 52. These supplemental sections, together with the span 42 and sections 46, form a circumferential lattice similar to that shown in Fig. 1. The sections 49 and 50 extend from sharp corners 53 and 54 on the underside of the section 43 toward junction 55. The sections 51 and 52 extend from sharp corners 56 and 57 on the junctions 55 toward stepped joints 58 and the rubber overlying the rim 45. The inclination of the sections 49—52 is such that radial loads are transmitted primarily in shear. It will be noted that the tread span 45 resting on the two side lattices tends to yield faster than the two side supports 44, 46, 49—52 on the side lattices. If, therefore, the load is sufficient to completely flatten the tread portion 43, additional load encounters increasing resistance, being the resultant of the two supporting lattices.

A preferred form of the segmental, inwardly, retractable cores is illustrated in Fig. 5. The under or inner side of the sections 51 and 52 is formed by radially split cores 59, each having a radial section 60 projecting through the space between the split rims 45. The upper or outer surfaces of sections 51 and 52 and the under or lower surfaces of the sections 49 and 50 are formed by segmental cores 61, each having a section 62 extending through the joint 58 and along the under surface of the core 59 and the outer surface of the core section 60. The adjacent surfaces of the sections 44 and 46 are formed by segmental cores 63, each having a section 64 extending through the joints 58 beneath the core section 62 and down along the outer surfaces of the core sections 62. The underside of the convex section 43 and the upper or outer side of sections 49 and 50 are formed by radially split segmental cores 65, each having a radial core section 66 extending through the center of the junction 55 and between the adjacent surface of the radially split cores 59. This is a preferred form of the segmental core construction since each of the core sections has a radially extending locating section (60, 62, 64, 66). The removal of the cores is effected sequentially as described above, cores 59 being removed first and being followed by the removal of cores 63, 61, and 65.

The tire is mounted through the use of a spacer comprising channel sections 67 clamped together by bolts 68. The channel sections have flanges 69 engaging the underside of the split rim section 45, and flanges 70 engaging a wheel rim 71. Upon tightening of the bolts 68 the rims 45 are brought together sufficient to close the openings formed by the cores 60, 62, 64, and 66. Thereafter the tire functions as though molded without the stepped separations since the forces on the sections 49—52 are in the direction to close the core openings.

In Figs. 7–11 is shown a tire in which the circumferential lattice section spirals at constant pitch along the axis of the tire to provide a helical lattice. Since the pitch of the helical lattice is short compared to the pad of the tread in contact with the road, the load and thrust resisting characteristics of the tire are substantially the same as the circumferential lattice tire. The construction distributes the gravity loads, the side loads, and the circumferential braking and traction stresses so that the accumulation of stresses at local points is largely avoided.

Figure 8:
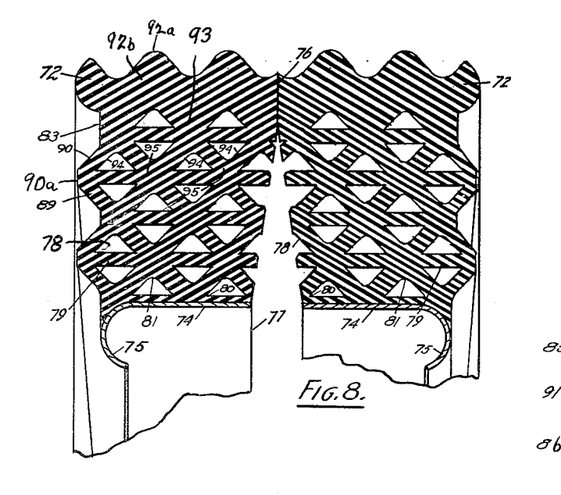
Fig. 8 in a section on line 8—8 of Fig. 7.
Figure 9:
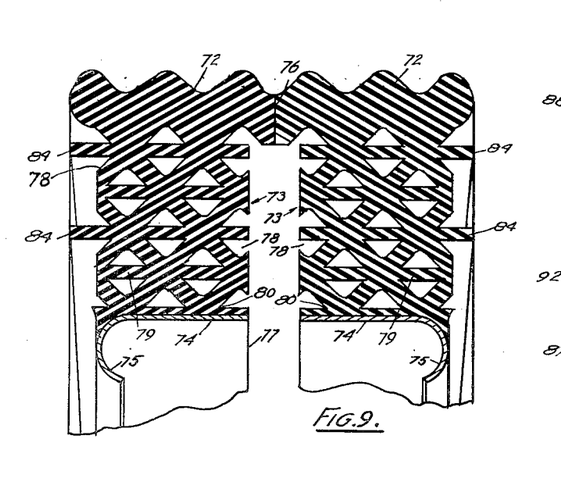
Fig. 9 is a section on line 9—9 of Fig. 7 slightly modified with respect to the central, cooling, air slot.

The helical lattice tire is preferably made in two symmetrical halves, right and left, which are placed together to form the tire as shown in Figs. 8 and 9. Each of the halves has a tread section 72, a helical lattice section 73 secured to rim section 74. The rim sections have downwardly curled edges 75 for attachment to a wheel rim. Such wheel rims and the engagement of the curled edge are standard. The tread sections butt at the center along a line 76. The rim sections are spaced apart at the center to provide a slot 77 for the flow of cooling air through the spiral openings 78 of the lattice section. The openings 78 have cross webs 79 connecting the horizontal ends of the diamonds, dividing the diamonds into pairs of triangles. As in the previously described constructions, the corners 80 at the horizontal ends are sharp since the load forces tend to squeeze these corners together and the intermediate corners 81 are rounded. Each half of the tire is made as a unit in a mold having pairs of triangular shaped helical cores spaced apart to form the diamond shaped openings 78 with the connecting cross web 79. The pitch of the spiral cores is such that each core extends from one side of the half tire to the other in one complete revolution. This results in elongated slits 82 (Fig. 7) on the side walls of the tire on opposite sides of the cross webs 79.

Figure 10:
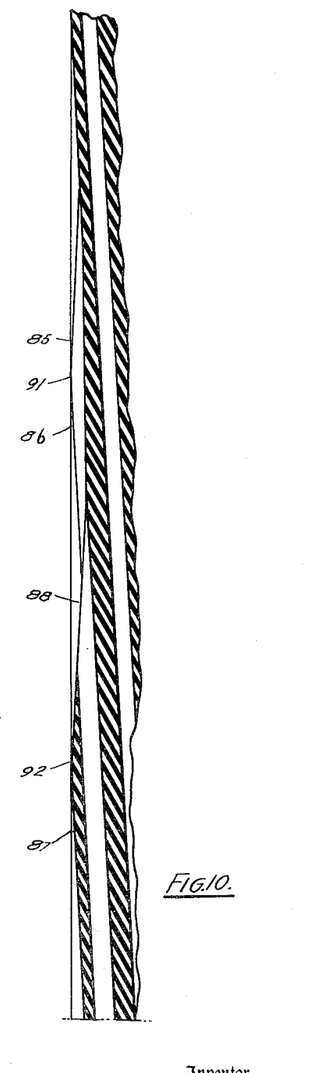
Fig. 10 is a fragmentary developed, circumferential section through a helical lattice.
Figure 11:
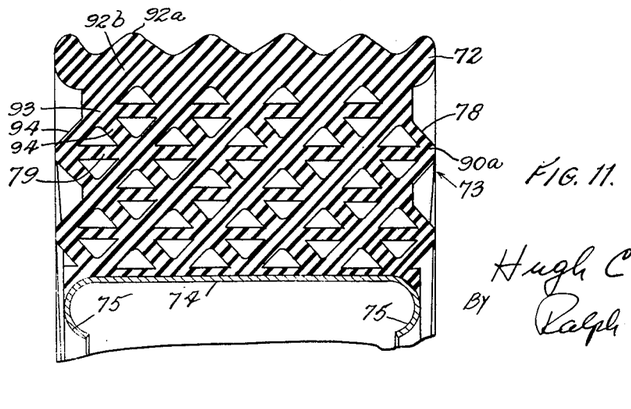
Fig. 11 is a transverse section through a helical lattice tire omitting the central, cooling, air slot.
Figure 12:
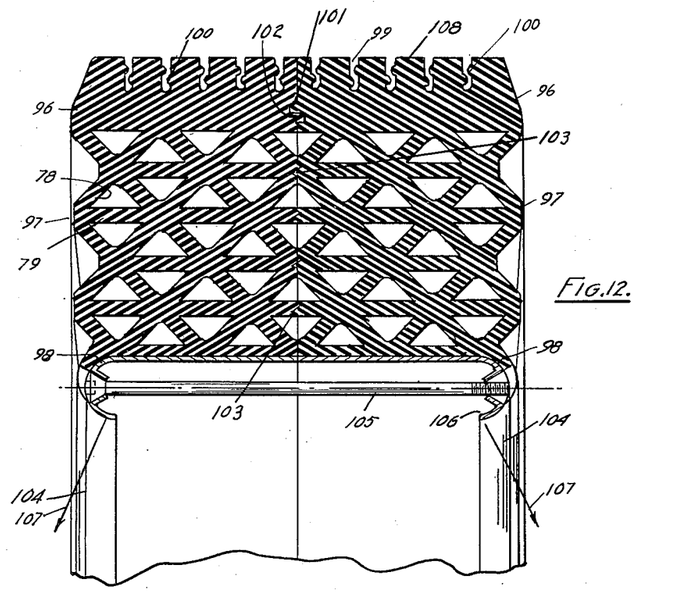
Fig. 12 is a transverse section through another helical lattice tire omitting the central, cooling, air slot, the tire being formed in axial halves with the lattices on the meeting faces in register to continue the spiral passages.
Figure 13:
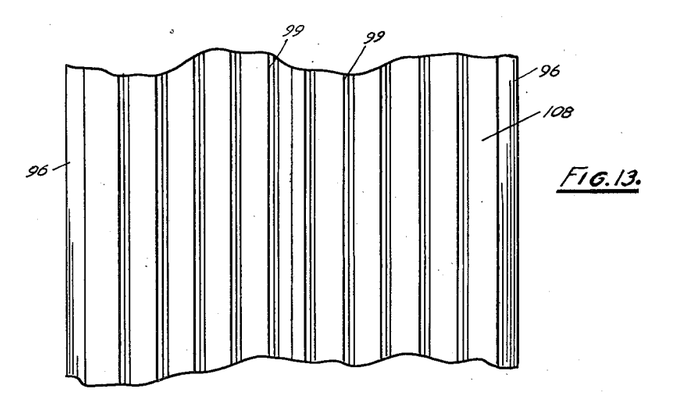
Fig. 13 is a plan view of the tread of the Fig. 12 tire.

The dissymmetry of the slits 82 (Fig. 7) is due to extensions to provide side cushions. The first and third tiers of diamonds (counting from the tread) instead of terminating at surfaces 83 (Fig. 8) in the plane of the outside edge of the rim 74, have the center web projecting to form ribs 84 (Fig. 9). These ribs extend for 60 degrees in the plane of the rim edge, slope outward for 60 degrees as indicated at 85 (Fig. 7), slope back to the plane of the rim edge as indicated at 86 and then repeat the pattern. The second and fourth tiers of diamonds (counting inward from the tread) follow the same pattern: 60 degrees in the plane of the rim edge, 60 degrees sloping out from the plane of the rim edge as indicated at 87, 60 degrees sloping back to the plane of the rim edge as indicated at 88. In the case of the second and fourth tiers, the side walls 89 and 90 of the diamonds project beyond the plane of the rim edge providing "tents" 90 enclosing the projecting web 79. This results in staggered V-shaped projections having peaks 91 and 92 as indicated in Fig. 10 forming buffers for the sides of the tire.

The cooling air enters through the openings on the outside of the tire on each side of the ribs 84 and in the tents 90a and travels along the openings to the space 77 between the rim sections 74. The cooling air slot 77 may be triangular as shown in Fig. 8 or of uniform width as shown in Fig. 9. From one aspect the circulation is due to the inertia of the outside air. The tire moves relative to the outside air and the differential between the inertia of the air and the friction drag on the walls of the openings 78 results in a heat transfer wiping action of the air against the walls of the openings 78.

The transmission of radial loads is the same as in the circumferential lattice tire. The load from the tread is transmitted from ribs 92a through inclined walls 92b by shear to junctions 93. From junctions 93, the load is transmitted by shear through inclined walls 94 to junctions 95. This load transmitting pattern is repeated through each tier of the lattice. The walls 92b and 94 are proportioned to have equal load carrying capacity. As in the circumferential lattice tire the load is carried through the inclined walls, and is distributed between compression and shear in a ratio determined by the inclination of the walls. The cross webs 79 resist horizontal spreading of diamonds and thereby increase the stiffness or load carrying capacity of the inclined walls. From another aspect the cross webs 79 resist bulging of the side walls of the tire under radial load. Since the function of the cross webs 79 is to resist this bulging movement the cross webs may be formed of any flexible material and need not be rubber.

In the Figs. 7–10 construction of the tire is made in right and left halves with the spiral in one half opposite to the spiral in the other half. In the Fig. 11 construction where the center slot 77 is omitted, the lattice spirals in the same direction. If the pitch is the same as illustrated in Figs. 7–10 the cooling air makes two complete revolutions around the tire while passing from one side of the tire to the other. The tents 90a on one side of the tire face forward and serve as inlets for the air. The tents 90a on the opposite side of the tire face backward and have an ejector action aiding the circulation of the air. In Figs. 7–10 the tents 90a on both sides of the tire face forward and serve as inlets. In other respects, the construction and operation is the same as in the Figs. 7–10 tire.

In Figs. 12–17 is shown a helical lattice tire molded in two halves with the lattice sections spiralling from one side of the tire to the other. Each half of the tire has a tread section 96, a helical lattice section 97 and a rim section 98 bonded to the lattice section.

The tread section has circumferential grooves 99 with axially extending ribs 100 which hold the tread against radial shrinkage upon cooling. The ribs 100 project from opposite sides of the groove in staggered overlapping relation. From one aspect, the ribs 100 serve as undercuts. The lattice section has the diamonds 78 and cylindrical cross webs 79 of the Figs. 7–11 tire. The diamonds and cross webs are formed by helical cores of triangular cross section. The cores spiral in the same direction in each half of the tire and when the halves are assembled, the openings formed by the cores are in register so there are continuous openings spiralling from one side of the tire to the other. There are interlocking or interfitting projections 101 and 102 in the tread sections and in junctions 103 in the lattice sections. These locate and hold the engaging faces of the tire section from radial displacement. The rim sections have curled edges 104 which are clamped against the wheel rim edges by through bolts 105. Upon tightening of the through bolts, the curled edges are centered on the wheel rim edges and in effect the tire rims are supported on the wheel rim by tension forces exerted on the inside of the curled edges 104. That is the line of contact between the curled edges and the wheel rim is in the region of 106 and this gives a wedging action on the under side of the edge of the standard drop rim. Other methods of engagement may be adopted but the engagement with the wheel rim is not limited to this specific arrangement. The force exerted on the curled edges is in the direction of the arrow 107. Because the tread section has ribs 108 which are parallel to the center line of the tire, there is no need to make the tire halves in right and left sections. The tire halves are identical.

Figures 14, 15, 16, 17:
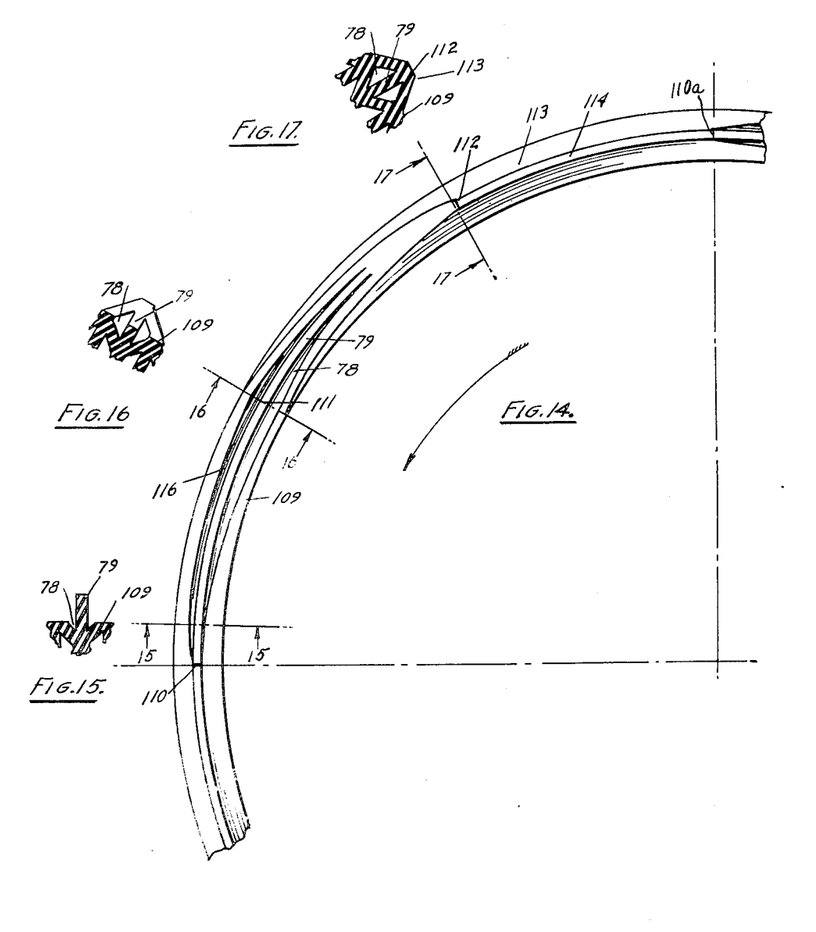
Fig. 14 is a fragmentary side view of one of the helical lattice sections.
Figs. 15, 16, and 17 are sections on lines 15—15, 16—16 and 17—17 of Fig. 14.

As shown in Figs. 14–17, the diamonds forming the lattice cushion section of the tire run out in the side walls in a manner to provide cooling air intake openings and curb buffer sections. In Fig. 15, the plane of the side wall of the tire is indicated at 109. The section is taken at a point where the diamond 78 is beginning to enter at the intake side of side wall. At this point, the web section 79 is approaching a peak 110, having started at point 111 in the plane 109 and slopes axially outward. In Fig. 16, the diamond 78 is half way into the tire side wall and the web 79 is flush with the tire side wall. At Fig. 17, the diamond which started at point 110a to emerge from the side wall 109 of the tire reaches a peak 112 and in effect provides a tent 113 facing in the direction of rotation of the tire at the inlet side and serving as a guide for the air entering the diamonds 78. At the discharge side of the tire this tent provides an ejector force to the discharge of air. From the peak 112, the tent 113 and the web 79 slopes back toward the plane 109 and reaches the plane at point 111. From point 110a where the tent starts to emerge from the side walls of the tire to the peak 112, the web 79 continues at a constant projection and provides a buffer rib 114. Each of the diamonds 78 and webs 79 repeats the same pattern.

Figure 18:
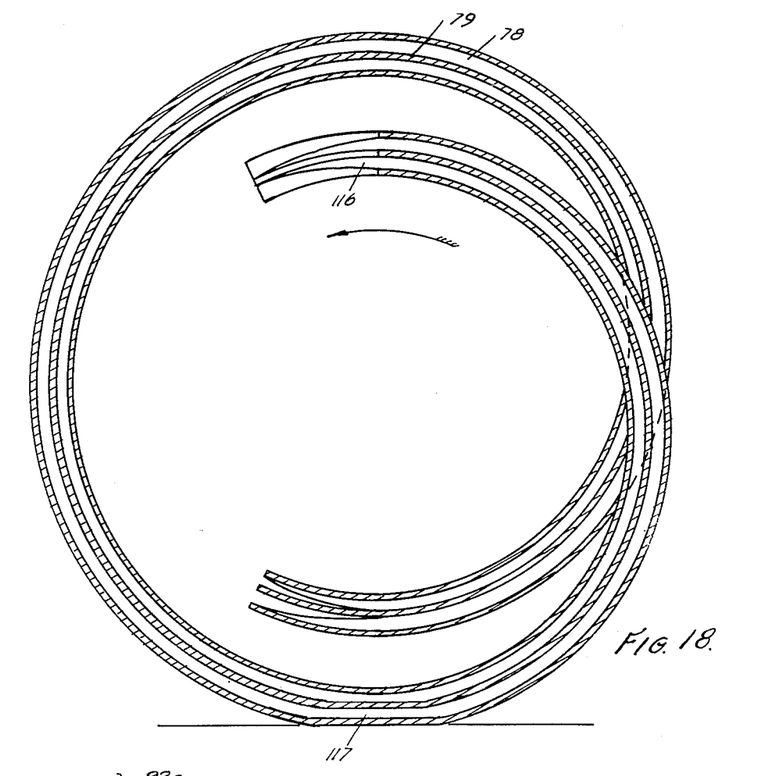
Fig. 18 is a cross section of one of the helical lattice sections.

Fig. 18 is a diagrammatic view showing one of the diamonds spiralling along the axis of the tire. As the tire rotates, elongated diamond shaped openings 116 under the tents 113 on one side of the tire bite into the stationary air and fill the diamonds 78. Except for friction drag which causes a wiping action against the inner surfaces of the diamonds 78, the air remains stationary due to its inertia and the diamonds spiral past the air. At the discharge ends of the openings 116 these tents have an ejector effect. In other words, the air except for the friction drag remains relatively stationary and the walls move spirally over the engaging air. At point of contact with the road, where the tire is relatively momentarily stationary with the road at the point of contact, the deflection under load results in a flattening of the diamonds indicated at 117. This flattening does not interfere with the relative movement between the air and the diamonds because it takes place at a point when both the tire and air are substantially stationary.

At this point the walls of the passage at the restriction reduces that area and passes along the air to exchange the air from one side to the other. This exchange takes place without a great disturbance in the relative movement of the air and walls in other parts of the passage except that induced by the frictional drag. The wiping air is subjected to a turbulence and passes from the wall surfaces readily to the inner areas of the passages as it is not materially disturbed through centrifugal action operating on the air. Thus its temperature is more nearly maintained and a greater proportion of the volume of air brought into heat exchange activity. This turbulence is accelerated at the restriction at the road. If liquid or such matter enter the passage the restriction assists in influencing a discharge.

What I claim as new is:

1. In a tire having an outer tread and an interior cushion, the cushion having circumferentially directed walls intersecting to form a lattice in section radially crosswise of the tire, the walls being spirally directed.

2. In a tire having an outer tread and an interior cushion, the cushion having circumferentially directed walls intersecting to form a lattice in section radially crosswise of the tire, the walls spiralling to provide passages through the cushion for cooling air.

3. In a tire having an outer tread and an interior cushion, the cushion having circumferentially directed walls intersecting to form a lattice in section radially crosswise of the tire, the walls spiralling to provide passages through the cushion for cooling air, the pitch of the spiral being such as to induce relatively little forward movement of the air as compared to the forward movement of the walls.

4. In a tire having a tread, and an intermediate cushion, the cushion having circumferentially extending walls intersecting to form a lattice having nested diamonds in radial section crosswise of the tread, and other circumferentially extending walls joining the sides of the diamonds and dividing the diamonds into triangles.

5. In a tire having a tread, a rim and an intermediate cushion free to yield locally, the cushion having walls intersecting to form a lattice of nested diamonds in section in a plane radial to the tread, and walls extending across the diamonds and dividing the diamonds into upper and lower triangles.

6. In a tire having a tread, a rim, and an intermediate cushion free to yield locally, the cushions having sections spaced apart axially to provide a center slot between the sections, and each section having circumferentially extending walls forming passages spiralling from the center slot toward the outside of the tire, the pitch of the spiral in one section being opposite to the pitch of the spiral in the other section.

7. In a tire having a tread, a rim, and an intermediate cushion free to yield locally, the cushion having circumferentially extending walls intersecting to form a lattice having nested diamonds in radial section crosswise of the tread, and other circumferentially extending walls joining the sides of the diamonds and dividing the diamonds into upper and lower triangles, the walls spiralling from one side of the tread to the other, and said first and other circumferentially extending walls alternately spiralling beyond the side of the cushion to provide respectively air receiving passageways and side cushion ribs.

8. In a tire, a tread, and a load carrying cushion for the tread having circumferentially extending helical walls intersecting to form angular openings with apexes extending radially, the walls spiralling axially from one side of the tread to the other.

9. In a tire, a tread, a load carrying cushion for the tread, circumferential air cooling openings in the cushion spiralling around the tread, and walls on the side of the cushion defining tents projecting into the air and aiding the flow of air through the openings.

10. In a tire having an outer tread, and an interior cushion free to yield locally, the cushion having circumferentially extending walls intersecting to form a lattice in radial section crosswise of the tread, the walls spiralling axially of the tire and the tread having spiral road contacting ribs conforming with the spiral of the lattice walls.

HUGH C. LORD.

REFERENCES CITED

The following references are of record in the file of this patent:

UNITED STATES PATENTS

| Number | Name | Date |
| --- | --- | --- |
| 485,633 | Keating | Nov. 8, 1892 |
| 819,036 | Ashley | May 1, 1906 |
| 912,943 | Duff | Feb. 16, 1909 |
| 982,634 | Reed | Jan. 24, 1911 |
| 1,494,797 | Nimschke | May 20, 1924 |
| 1,557,324 | Pestunowitz | Oct. 13, 1925 |
| 1,662,007 | Kuhlke | Mar. 6, 1928 |
| 1,685,955 | Overman | Oct. 2, 1928 |
| 1,841,773 | Worsley et al. | Jan. 19, 1932 |
| 2,048,635 | Kraft | July 21, 1936 |
| 2,108,406 | Kraft | Feb. 15, 1938 |
| 2,150,107 | Shields | Mar. 7, 1939 |

FOREIGN PATENTS

| Number | Country | Date |
| --- | --- | --- |
| 489,359 | Great Britain | 1938 |
| 647,230 | Germany | Oct. 16, 1934 |